(12) United States Patent
Kumhyr

(10) Patent No.: US 6,631,500 B1
(45) Date of Patent: Oct. 7, 2003

(54) METHOD, SYSTEM AND COMPUTER PROGRAM PRODUCT FOR TRANSFERRING HUMAN LANGUAGE DATA ACROSS SYSTEM BOUNDARIES

(75) Inventor: David Bruce Kumhyr, Fuquay-Varina, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/211,800

(22) Filed: Dec. 15, 1998

(51) Int. Cl.[7] .............................................. G06F 17/21
(52) U.S. Cl. ...................................................... 715/531
(58) Field of Search ..................... 707/531, 4; 345/703; 715/531

(56) References Cited

U.S. PATENT DOCUMENTS

| | | | |
|---|---|---|---|
| 5,243,519 A | * | 9/1993 | Andrews et al. ................ 704/8 |
| 5,349,526 A | * | 9/1994 | Potts, Sr. et al. ................ 704/9 |
| 5,583,761 A | * | 12/1996 | Chou ........................... 707/536 |
| 5,678,039 A | * | 10/1997 | Hinks et al. ............. 707/533 X |
| 5,778,356 A | * | 7/1998 | Heiny ............................ 707/2 |
| 5,793,381 A | * | 8/1998 | Edberg et al. ............... 345/467 |
| 5,802,539 A | * | 9/1998 | Daniels et al. ............... 707/542 |
| 5,812,964 A | | 9/1998 | Finger ............................ 704/7 |
| 5,974,372 A | * | 10/1999 | Barnes et al. ........... 707/536 X |
| 6,272,495 B1 | * | 8/2001 | Hetherington .......... 707/531 X |

FOREIGN PATENT DOCUMENTS

EP 134897 * 3/1985 .............. G06F/9/44

OTHER PUBLICATIONS

Anonymous, "Dynamic Language Switching in Performance–Oriented Graphical User Interface", International Business Machines Technical Disclosure Bulletins, v. 37, n. 4A, pp. 387–388, Apr. 1994.*

Anonymous. "Language Switching Using Product Loader", International Business Machines Technical Disclosure Bulletins, v. 34, n. 4B, p. 15, Sep. 1991.*

Anonymous, "Tool for Creating Data Object with Selectable Strings", International Business Machines Technical Disclosure Bulletins, v. 37, n. 3, pp. 191–192, Mar. 1994.*

Anonymous, "Generic Facility to Display Kernel Messages to User Mode Processes for a UNIX based Operating System", IBM Technical Disclosure Bulletins, v. 34, n. 10, pp. 339–341, Mar. 1992.*

(List continued on next page.)

*Primary Examiner*—Stephen S. Hong
(74) *Attorney, Agent, or Firm*—Marilyn Smith Dawkins; Bracewell & Patterson, L.L.P.

(57) ABSTRACT

A multi-field text string object is employed to transfer data across systems running in different human languages. The text in the characters/language of the originating system is stored in a first field; a common or cross-language representation, preferably a phonetic spelling of the text in latin characters, is stored in a second field. Upon migration of the multi-field text string object from one system to another, a language property of the multi-field text string object (which should match a language property of the originating system) is compared to a language property of receiving system. If the language properties coincide, the contents of the first field are utilized for display and processing of the text string; if the language properties do not coincide, the multi-field text string object automatically switches fields and presents the contents of the second field—the common, cross-language representation—for display and processing. Systems running in completely incongruous languages, such as Russian and Japanese, may thus meaningfully share data without relying on encoded lookups and without being restricted to exchanging data in one language only.

23 Claims, 5 Drawing Sheets

OTHER PUBLICATIONS

Anonymous, "GUI Builder V. I. Corporation Ships First GUI Builder to Support X11R5, Motif 1.2, & Generate C++Code: X–Designer 3.0", Edge: Workgroup Comp. Rpt., v. 4, n. 148,. p. n/a, Mar. 1993.*

BusinessWire, "Gentia Networked Business Intelligence Solution Speaks 30 Languages: Gentia 4.0 Enables Companies to Globally Deploy Analytical Appluications . . . ", 776 words, Mar. 9, 1998.*

PR NewWire. "Advantagekbs to Preview Global Support Tools at Support Service Conference & Expo", 754 words, Sep. 8, 1998.*

* cited by examiner

METHOD, SYSTEM AND COMPUTER PROGRAM PRODUCT FOR TRANSFERRING HUMAN LANGUAGE DATA ACROSS SYSTEM BOUNDARIES

RELATED APPLICATIONS

The present invention is related to the subject matter of the following commonly assigned, U.S. patent applications: Ser. No. 09/211,810; Ser. No. 09/211,809; Ser. No. 09/211,808; Ser. No. 09/211,803; Ser. No. 09/211,799; Ser. No. 09/211,802; Ser. No. 09/211,813; Ser. No. 09/211,801; and Ser. No. 09/211,812. The content of the above-referenced applications is incorporated herein by reference.

BACKGROUND OF THE INVENTION

1. Technical Field

The present invention relates in general to transferring locale-specific human language data between systems running in different languages and in particular to automatically switching the language in which text data is displayed or processed upon migrating between systems running in different languages. Still more particularly, the present invention relates to switching between fields of a multi-fields text string class encapsulating human language variants of a text string based on an underlying language property.

2. Description of the Related Art

Multinational companies often run information system (IS), networks which span multiple countries spread around the globe. To maximize the usefulness of such networks, operations within each country tend to run in the local language of the country. Where possible, names of abstract objects in user applications are in the local language and match the local language organization, city, or human names which the abstract objects represent. In the case of system management software, often abstract objects would represent each of a global enterprise's local offices.

Central management of such a global network may be difficult or impossible when abstract object names utilize the local language and the local language's underlying character set. For offices located in Egypt, abstract objects would most naturally be named in Arabic; offices in Russia would name objects utilizing the Cyrillic character set; and for offices in Japan, objects would be named in Japanese. A problem arises, however, when a enterprise's headquarters IS staff attempts to examine these objects. The IS staff at the multinational headquarters located in the United States is unlikely to be able to read Arabic or Japanese, or even recognize Cyrillic characters.

Japanese, for example, is a logosyllabic or ideographic language which does not have an alphabet representing simple sounds, but instead has a very large character set with symbols ("ideographs") corresponding to concepts and objects rather than simple sounds. For instance, the Joyo Kanji List (Kanji for Daily Use) adopted for the Japanese language in 1981 includes 1945 symbols. Users unfamiliar with the Kanji characters will have difficulty identifying a particular abstract object named in Japanese, as well as difficulty even discussing such abstract objects over the telephone with an English and Japanese-speaking counterpart.

Additionally, merely seeing an ideograph may provide no clue as to the correct meaning or pronunciation since, in Japanese, the same character may have multiple meanings or pronunciations. For instance, the character depicted in FIG. 6A may mean either "West" or "Spain"; the symbol depicted in FIG. 6B may be pronounced either "hayashi" or "rin" (or "lin"); and the characters depicted in FIG. 6C may be pronounced "suga no," "suga ya," "kan no," or "kan ya." This circumstance is based in part on the history of the Japanese language, in which the Kanji characters were adopted from the Chinese language. Thus, for example, the "rin" symbol depicted in FIG. 6B is On-Yomi, basically a simulation of the Chinese pronunciation when the character was imported to Japan, while "hayashi" is Kun-Yomi, a Japanese word assigned to the character which has the same meaning.

Data originating on a Japanese system and sent to a system running in English is therefore unintelligible to a user who only speaks and reads English. Even if the user understands the text, however, the data is also likely to be meaningless to the system. Keyword searches, for example, for an English word are not likely to identify foreign counterpart words as matches. System messages from the originating system will also be incomprehensible to the receiving system. Currently portions of distributed systems operating in different human languages can communicate only by utilizing encoded values to perform lookups in message catalogs, or by exchanging data in only one language.

It would be desirable, therefore, to provide a mechanism for transferring locale-specific data between systems running in different languages. It would further be advantageous for the mechanism to automatically switch the language employed for display or processing of text data upon crossing boundaries between systems running in different languages.

SUMMARY OF THE INVENTION

It is therefore one object of the present invention to provide a method, system and computer program product for transferring locale-specific human language data between systems running in different languages.

It is another object of the present invention to provide a method, system and computer program product for automatically switching the language in which text data is displayed or processed upon migrating between systems running in different languages.

It is yet another object of the present invention to provide a method, system and computer program product for switching between fields of a multi-field text string class encapsulating human language variants of a text string based on an underlying language property.

The foregoing objects are achieved as is now described. A multi-field text string object is employed to transfer data across systems running in different human languages. The text in the characters/language of the originating system is stored in a first field; a common or cross-language representation, preferably a phonetic spelling of the text in latin characters, is stored in a second field. Upon migration of the multi-field text string object from one system to another, a language property of the multi-field text string object (which should match a language property of the originating system) is compared to a language property of receiving system. If the language properties coincide, the contents of the first field are utilized for display and processing of the text string; if the language properties do not coincide, the multi-field text string object automatically switches fields and presents the contents of the second field—the common, cross-language representation—for display and processing. Systems running in completely incongruous languages, such as Russian and Japanese, may thus meaningfully share data without relying on encoded lookups and without being restricted to exchanging data in one language only.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIGS. 6A–6C are ideographs having multiple meanings or pronunciations.

DETAILED DESCRIPTION OF THE PREFERRED EMBODIMENT

Figure 1:
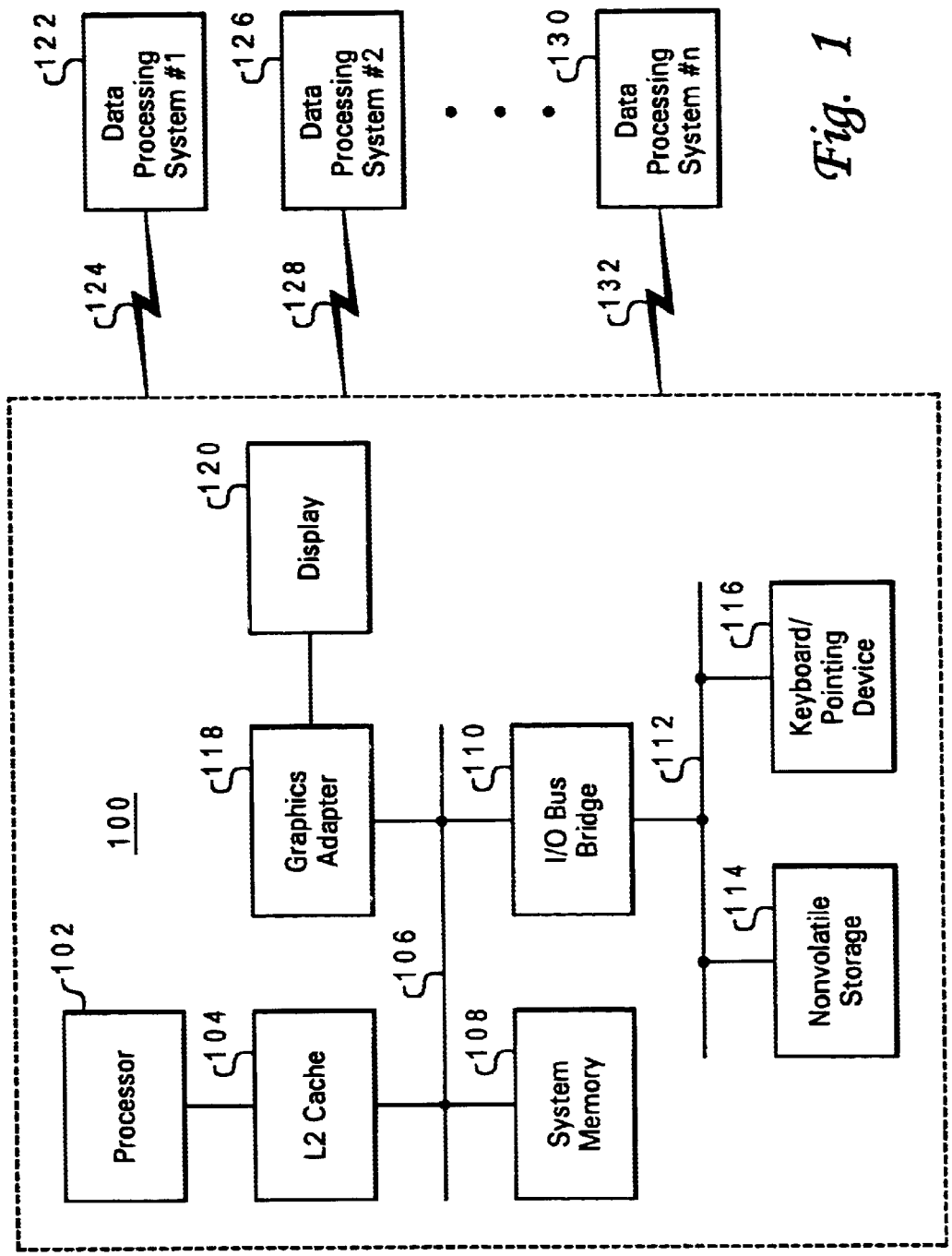
FIG. 1 depicts a block diagram of a data processing system network in which a preferred embodiment of the present invention may be implemented.

With reference now to the figures, and in particular with reference to FIG. 1, a block diagram of a data processing system network in which a preferred embodiment of the present invention may be implemented is depicted. The data processing system network depicted includes a data processing system 100, which may be, for example, one of the Aptiva® models of personal computers available from International Business Machines Corporation of Armonk, New York. Data processing system 100 includes a processor 102, which in the exemplary embodiment is connected to a level two (L2) cache 104, which is connected in turn to a system bus 106. In the exemplary embodiment, data processing system 100 includes graphics adapter 118 connected to system bus 106, receiving user interface information for display 120.

Also connected to system bus 106 is system memory 108 and input/output (I/O) bus bridge 110. I/O bus bridge 110 couples I/O bus 112 to system bus 106, relaying and/or transforming data transactions from one bus to the other. Peripheral devices such as nonvolatile storage 114, which may be a hard disk drive, and keyboard/pointing device 116, which may include a conventional mouse, a trackball, or the like, are connected to I/O bus 112.

The exemplary embodiment shown in FIG. 1 is provided solely for the purposes of explaining the invention and those skilled in the art will recognize that numerous variations are possible, both in form and function. For instance, data processing system 100 might also include a compact disk read-only memory (CD-ROM) or digital video disk (DVD) drive, a sound card and audio speakers, and numerous other optional components. All such variations are believed to be within the spirit and scope of the present invention.

Data processing system 100 is coupled to data processing system 122 via communications link 124, to data processing system 126 via communications link 128, and to data processing system 130 via communications link 132. Data processing systems 122, 126, and 130 may collectively form a distributed system in accordance with the known art, or otherwise exchange data including human language text such as files or system messages.

The data processing system network which is depicted and the Java implementation examples below are provided solely as examples for the purposes of explanation and are not intended to imply architectural limitations. Those skilled in the art will recognize the numerous programming languages which may be utilized, all of which are believed to be embraced within the spirit and scope of the invention.

Figure 2:
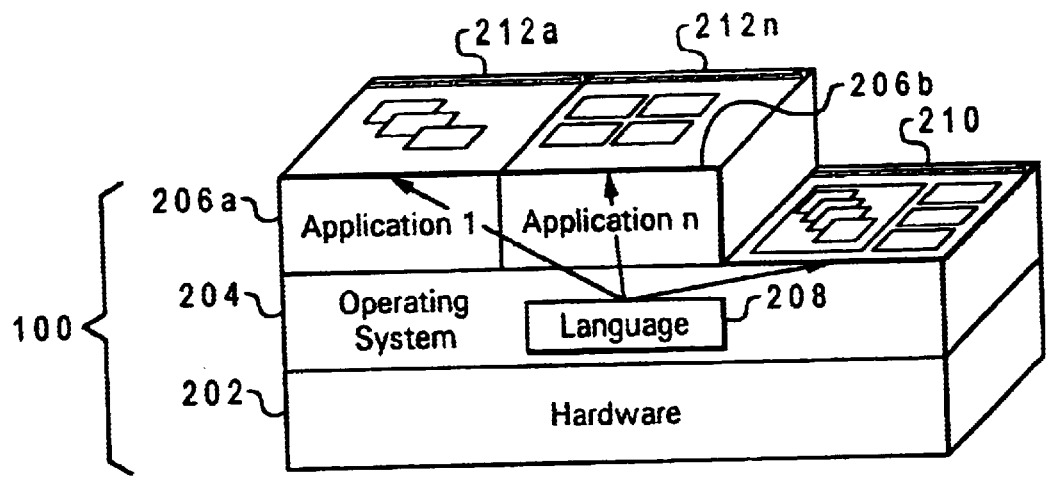
FIG. 2 is a functional diagram of a data processing system within a data processing system network in accordance with a preferred embodiment of the present invention.

Referring to FIG. 2, a functional diagram of a data processing system within a data processing system network in accordance with a preferred embodiment of the present invention is illustrated. As is known in the art, an operating system 204 runs on the hardware 202 making up data processing system 100. Hardware 202 includes the components depicted in FIG. 1 for data processing system 100. Operating system 204, as depicted in FIG. 2, is meant to include all software routines which control interaction with hardware 202, such as a basic input/output system (BIOS) allowing data reads and writes to a hard disk drive or other nonvolatile memory, as well as those software routines which enable an application to be utilized on data processing system 100. Operating system 204 may be, for instance, any of the Windows™ operating systems available from Microsoft Corporation of Redmond, Wash., including Windows NT.

In the preferred embodiment, data processing system 100 also includes an applications 206a–206n running on top of operating system 202. Applications 206a–206n may be distributed applications executing on a network or group of networks spanning different systems or platforms.

Applications 206a–206n in the exemplary embodiment preferably have some communication directly with operating system 204. Operating system 204 includes a language property 208 specifying which human language is employed for display of text within the user interface 212 of operating system 204 and the user interfaces 212a–212n of applications 212a–212n, as well as for processing of text (e.g., system messages) within operating system 204 and applications 212a–212n.

In the present invention, a locale property may be employed in addition to language property 208 and the structure of the cultural support features may be split between the locale property and language property 208. The locale property may be employed to support cultural conventions such as regional holidays and religious dates, observance of daylight savings time, etc., and display formatting of currency, numbers, dates, and the like. However, the language of user interface and system message text is based on language property 208. In a preferred embodiment, language property 208 contains a lower-case, two letter ISO Language Code as defined by ISO-639 (e.g., "en" for English or "ru" for Russian). Language property 208 is employed in conjunction with a multi-field text string object as described below to transfer locale-specific human language data between systems running in different languages and to automatically switch the language in which text data is displayed or processed upon migrating between systems running in different languages.

Figure 3:
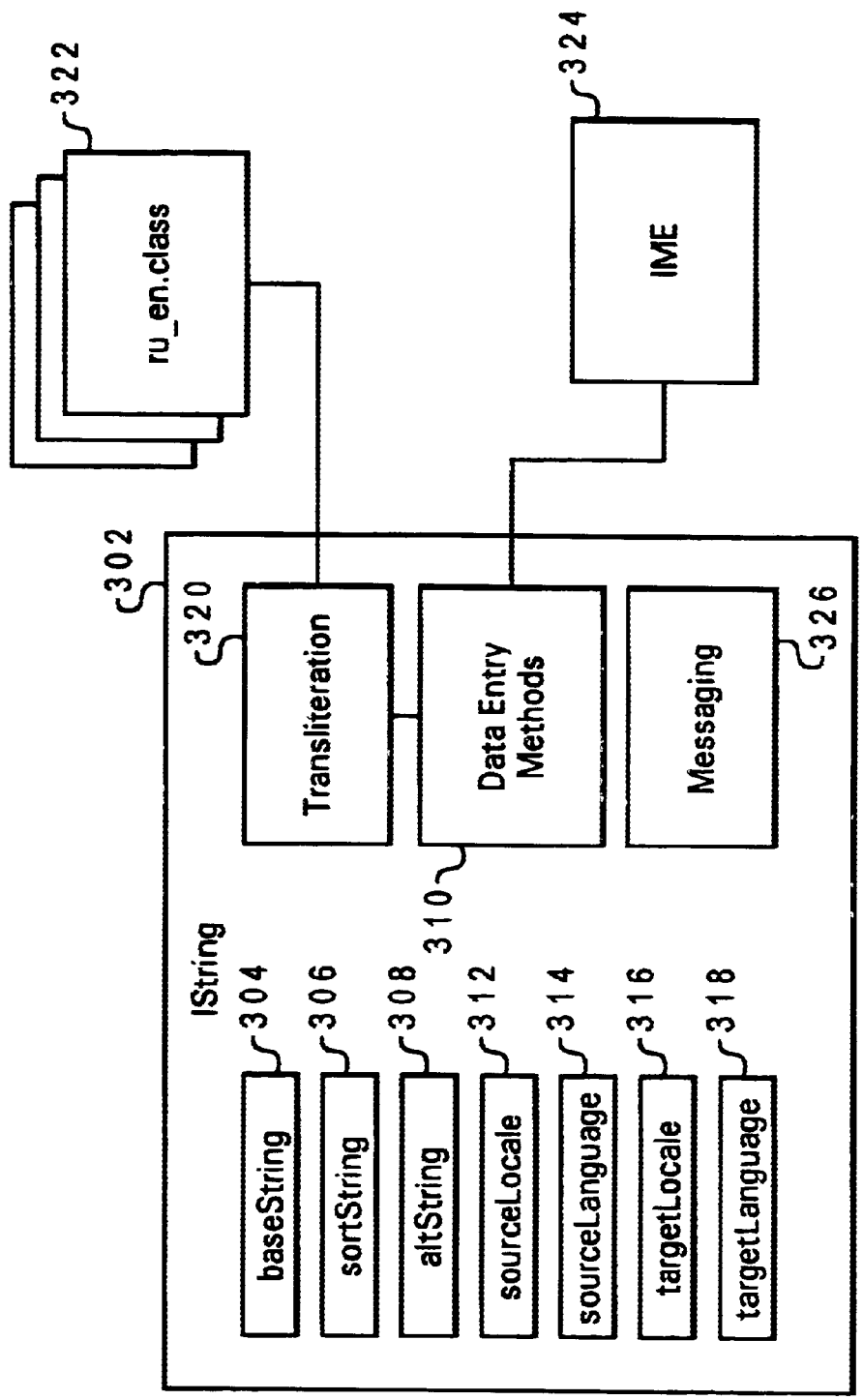
FIG. 3 depicts a diagram of a multi-field text string class employed in transferring human language data between systems running in different languages in accordance with a preferred embodiment of the present invention.

With reference now to FIG. 3, a diagram of a multi-field text string class employed in transferring human language data between systems running in different languages in accordance with a preferred embodiment of the present invention is depicted. International String Control ("IString") class 302 may be utilized in conjunction with the language property described above, particularly within data processing system networks spanning multiple countries around the globe. A fundamental problem in multinational computing environments which need to display or process data in multiple human languages is that a representation in one human language may become meaningless as the data migrates to a system running in a different human language. A need exists, therefore, to capture alternative human language representations. This need is satisfied by IString class 302.

IString class 302 is preferably a Java class similar to the Java String class, which behaves like the String class by including similar methods. Most of the original behavior of the String class should be preserved, with additional functionality added and utilized only as needed. IString class 302 is a datatype which captures some of the meaning of spoken words which is normally lost when the word is reduced to a visual representation. IString class 302 is preferably utilized for all object names and system messages within a system.

The IString class 302 structure includes three different strings for each name, message, data, or text object: a baseString 304, a sortString 306, and an altString 308. BaseString 304 is the string within IString class 302 employed by default in the user interface display and may contain any text, usually the original text entered by the user in the local language where the IString object is created. SortString 306 may also be any text and is employed to allow correct sorting of non-phonetic languages and languages which are difficult to sort based only on the binary value of baseString 304. AltString 308 may be any text but should conventionally be filled with a latin character set representation of the pronunciation of the data contained in baseString 304. Thus, IString class 302 includes the original text (baseString 304), a sort key (sortstring 306), and a pronunciation key (altstring 308) for object names, system messages, and other data.

When implemented in Java, a constructor for an IString class 302 object may be composed of the following fields:
/** The base text String */ protected String baseString;
t** The related text String for proper collation */ protected String sortString;
/** The related alternate text String (pronunciation key) */ protected String altString;
The source locale, as an ISO-3166 code; used for collation */ protected String sourceLocale;
/** The source language, as an ISO-639 code */ protected String sourceLanguage;
The source variant defined for EBCIDIC and case mapping */ protected String sourceVariant;
/** The target locale, as an ISO-3166 code */ protected String targetLocale;
The target language, as an ISO-639 code */ protected String targetLanguage;
/** The target variant defined for EBCIDIC and case mapping */ protected String targetVariant;

Complete listings of the upper-case, two letter ISO Country Codes defined by ISO-3166 and the lower-case, two letter ISO Language Codes defined by ISO-639 are readily available from a variety of sources on the Internet.

Table I illustrates how data within the IString data type 302 looks when represented as a table:

TABLE I

| Field | Type | Data |
|---|---|---|
| baseString | Java String | The user's text |
| sortString | Java String | Language/locale dependent |
| altString | Java String | Language/locale dependent |
| sourceLocale | Java String | ISO-3166 code, example "US" |
| sourceLanguage | Java String | ISO-639 code, example "en" |
| targetLocale | Java String | ISO-3166 code, example "JP" |
| targetLanguage | Java String | ISO-639 code, example "ja" |

A Java constructor for a new, empty IString class object 302 where the contents are independent of language or locale may be:

/***********************************************
*
* <P></P>
*
<dt><b>Description:</b><dd>
<p>Allocate a new IString containing no characters in default
* locate.</p>
*
***********************************************
public IString( ){
    this.baseString=new String( );
    this.sortString=new String( );
    this.altString=new String( );
}

To allow objects of the IString class 302 datatype to be stored in an Object Database (ODB), however, and to permit manipulation of IString data by legacy framework applications, an Interface Definition Language (IDL) class should be defined:

struct IString{
string baseString; //base test String
string sortString; //related text String for collation
string altString; //related alternate text String (pronunciation)
string sourceLocale; //source locale as an ISO-3166 code
string sourceLanguage; //source language as an ISO-639 code
string targetLocale; //target locale as an ISO-3166 code
string targetLanguage; //target language as an ISO-639 code
}

The contents of baseString 304, sortstring 306, and altstring 308 are preferably but not necessarily Unicode text entered by data entry methods 310 within IString class 302. Data entry methods 310, and thus the contents of baseString 304, sortstring 306, and altstring 308, may depend at least in part on language and locale parameters defined by sourceLocale field 312, sourceLanguage field 314, targetLocale field 316, and targetLanguage 318.

Because data entry methods 310 are dependent on the locale and/or langauge employed by the underlying host system, creation of a new IString object 302 preferably results in the locale and language properties of the host system in which the IString object 302 is created being placed in sourceLocale field 312 and sourceLanguage field 314. A constructor for allocating a new, empty IString for a specified locale and language determined from the host system in which the IString class object 302 is being created may be:

```
/************************************************
 *
 * <P></P>
 *
 * <dt><b>Description:</b><dd>
 * <p>Allocate a new IString containing no characters in
    the
 * specified locate.</p>
 *
 ************************************************/
public IString(Locale loc){
   this.baseString=new String( );
   this.sortString=new String( );
   this.altstring=new String( );
   this.sourceLocale=loc.getLocale( );
   this.sourceLanguage=loc.getLanguage( );
}
```

Input of data into an IString class 302 object is preferably locale- or language-dependent. The source-Language and targetLanguage properties 314 and 318 control how data is input into an IString class object 302 by data input methods 310. The sourceLanguage property 314 may be set to the language property of the host system on which the IString class object is created. The targetLanguage property 318 may also be set to that language, or may alternatively be set to a common, "universal" language such as English. Data input methods 310 compare sourceLanguage and targetLanguage properties 314 and 318 to determine what is entered into baseString 304, sortString 306, and altString 308 in an IString class object 302.

Character strings are entered into the baseString 304, sortstring 306, and altString 308 fields by data input methods 320 for IString class 302, which may selectively utilize data from either the user's direct entry or specification, from transliteration engine 320, or from the Input Method Editor (IME) 324. Where the targetLanguage property 318 is set to English as a default, data entry methods 310 determine the contents of baseString 304, sortstring 306, and altstring 308 fields based upon the character set employed by the language in which data is entered by the user (sourceLanguage property 314).

For languages which employ the latin character set, the user input is placed by data entry methods 320 into all three fields (baseString 304, sortString 306, and altString 308) of the IString class 302 by data entry methods 310. A suitable constructor may be:

```
/************************************************
 *
 * <P></P>
 *
 * <dt><b>Description:</b><dd>
 * <p>Allocate a new IString contains the same sequence
    of
 * characters as the string argument in the specified
    locale.</p>
 *
 ************************************************/
```

```
public IString(String str, Locale loc){
   this.baseString=new String(str);
   this.sortstring=new String(str);
   this.altstring=new String(str);
   this.sourceLocale=loc.getLocale( );
   this.sourceLanguage=loc.getLanguage( );
}
```

For most locales and languages, the entered string will be input into all three fields of the IString object 302. If targetLanguage property 318 were not set to English, data entry methods 324 would input the user-entered text into all three fields whenever the languages identified in source-Language and targetLanguage properties 314 and 318 employ a common character set (e.g., both employ latin characters, as in the case of Spanish and Afrikaans).

Table II illustrates how data is entered into IString class 302 fields where the host language and locale utilize the latin character set.

TABLE II

| Field | Type | Data |
|---|---|---|
| baseString | Java String | Hetherington |
| sortString | Java String | Hetherington |
| altString | Java String | Hetherington |
| sourceLocale | Java String | US |
| sourceLanguage | Java String | en |
| targetLocale | Java String | US |
| targetLanguage | Java String | en |

If desired, the fields may be individually edited and the object artificially promoted for sorting purposes by inserting a string having a lower sort value (e.g., "AAA_ Hetherington") into sortString 306.

For languages which do not employ the latin character set, but which utilize a character set which may be sound mapped to the latin character set, the user input is entered by data entry methods 310 into baseString 304 and sortString 306, but a transliterated, phonetic representation of the input is placed in altString 308. An internal method within the transliteration engine 320 is employed to sound-map the passed string to a phonetic, latin character representation for altstring 308 to transliterate entered characters into other characters understandable to people who are not familiar with the character set of the original language.

To generate the contents of altstring 308, transliteration engine 320 selects an appropriate Java resource file 322 containing a mapping table to create the alternate text to be placed in altString 308. The selection of the particular resource file which is employed based on the combination of source and target languages. Java resource files 322 are named for the combination of languages for which the mapping is being performed. In the example shown in FIG. 2, ru_en.class is for mapping Russian (Cyrillic characters) to English (Latin characters). The structure of resource file 322 is a table with associated entries for foreign language characters and corresponding latin characters.

A suitable constructor for an IString object in which altstring 308 is transliterated from the passed string may be:

```
/************************************************
 *
 * <P></P>
 *
 * <dt><b>Description:</b><dd>
 * <p>Allocate a new IString. The baseString and sort-
    String are the
 * language.</p>
 *
 ************************************************/
```

```
public IString(String str){
    this.baseString=new String(str);
    this.sortString=new String(str);
    if(isSameLanguage( ))
        this.altstring=new String(str);
    else
        this.altString=transmogrify(str,
            this.sourceLanguage,
            this.targetLanguage);
}
```

The "transmogrify" method is the internal method within transliteration engine 320 which was described above. The character set into which the entered characters are transliterated is determined from the targetLanguage property 318, which in the exemplary embodiment is assumed to be set to English. Given an appropriate resource file 322, however, characters may be transliterated between any two languages for which characters in one language sound-map to one or more characters in the other.

Table III illustrates how data is entered into IString class 302 by data entry methods 310 where the language utilizes a non-latin character set which maps to the latin character set, such as Russian Cyrillic.

TABLE III

| Field | Type | Data |
| --- | --- | --- |
| baseString | Java String | Давид Кумгир |
| sortString | Java String | Давид Кумгир |
| altString | Java String | David Kumhyr |
| sourceLocale | Java String | RU |
| sourceLanguage | Java String | ru |
| targetLocale | Java String | US |
| targetLanguage | Java String | en |

In the example shown, the text entered by the user is inserted into both baseString 304 and sortstring 306, but the text entered into altstring 308 is selected by transliteration engine 320 utilizing a resource table of Russian Cyrillic to English character sound mappings. The phonetic representation of the baseString 304 is thus entered into altString 308 as a pronunciation key for users unfamiliar with the Cyrillic character set.

For languages which do not employ the latin character set or a character set which may be sound-mapped to the latin character set, data entry methods 310 input data into the baseString 304, sortString 306, and altstring 308 fields which is derived from the input method editor (IME) 324. IME 324 may be either a customized input method editor or the input method editor which is integrated into Asian versions of the Windows NT operating system available from Microsoft Corporation of Redmond Wash., If the Windows NT input method editor is employed, the appropriate data must be extracted from the Windows NT input method editor internal data storage.

Table IV illustrates how data is entered into IString class 302 by data entry methods 310 for logosyllabic languages, such as Japanese, which employ neither the latin character set nor a character set which may be sound-mapped to the latin character set.

TABLE IV

| Field | Type | Data |
| --- | --- | --- |
| baseString | Java String | <Kanji> |
| sortString | Java String | はやし |
| altString | Java String | hayashi |
| sourceLocale | Java String | JP |
| sourceLanguage | Java String | ja |
| targetLocale | Java String | US |
| targetLanguage | Java String | en |

Logosyllabic languages do not have alphabets, but instead have very large character sets with symbols ("ideographs") corresponding to concepts and objects rather than simple sounds. For instance, the Joyo Kanji List (Kanji for Daily Use) adopted for the Japanese language in 1981 includes 1945 symbols. Normal computer keyboards cannot contain enough separate keys to have one for each symbol in the language, so input is accomplished phonetically utilizing keystroke combinations to select characters from one of two phonetic syllabaries, hiragana or katakana, and dictionary lookup for Kanji symbol creation. The process is implemented in the Windows NT input method editor identified above.

For logosyllabic or ideograhic languages, therefore, the data entered into altString 308 is the latin characters typed by the user to compose the desired ideograph. The data entered into sortstring 306 are the syllabary characters phonetically spelling the desired ideograph, providing an intermediate representation of the ideograph. The data entered into baseString 304 is the final ideograph selected by the user. As with transliteration of non-latin characters as described above, non-latin characters may be entered into altstring 308 if the targetLanguage property is set to a language other than English and IME 324 supports composition of the ideographs by phonetic spelling in a language other than English. For instance, an IString object 302 might contain Japanese Kanji in baseString 304, hiragana in sortstring 306, and Cyrillic characters in altstring 308 if IME 324 permits composition of Japanese Kanji characters by phonetic spelling in Russian.

A suitable constructor for receiving baseString 304, sortstring 306 and altstring 308 from IME 324 via data entry methods 310 for entry into an IString object 302 may be:

```
/**********************************************
 *
 * <P></P>
 *
 * <dt><b>Description:</b><dd>
 * <p>Allocate a new IString. The baseString and sort-
     String
   altString are entered from the IME utilizing the default
     language and
 * locale.</p>
 *
 **********************************************
public IString(String base,
    String sort,
    String alt,
    Locale src,
    Locale tgt){this.baseString=base; this.sortString=sort;
        this.altstring=alt; this.sourceLocale=src.getLocale(
        ); this.sourceLanguage=src.getLanguage( );
        this.targetLocale=tgt.getLocale(       );
        this.targetLanguage=tgt.getLanguage( ); }
```

The contents of baseString 304, sortstring 306 and altString 308 are entered into the respective fields from data derived from IME 324, while the contents of sourceLocale 312 and sourceLanguage 314 are entered from the default locale and language properties specified by the host system in which data is being entered into IString object 302. The contents of targetLocale 316 and targetLanguage 318 will typically be a locale/language code for a language utilizing the latin character set such as "en_US" (English—United States).

Regardless of the language in which text is entered into an IString class object 302, the data automatically entered into each of the baseString 304, altString 306, and sortstring 308 by data entry methods 310 may be overridden or altered using other methods. The fields of an IString object 302 may preferably be individually and independently edited, allowing artificial promotion within sortstring field 306 as described above, replacement of an erroneously selected ideograph in baseString field 304, or correction of a phonetic spelling within altstring field 308.

While the above-described methods assumed that the source and target languages were taken from host system defaults, data may alternatively be entered into baseString 304, sortstring 306 and altstring 308 for specified source and target languages utilizing the constructor:

```
/**********************************************
*
* <P></P>
*
* <dt><b>Description: </b><dd>
* <p>Allocate a new IString. The baseString, sortString
  and
* altstring are entered from the IME for specified target
  and source
* language and locale. </p>
*
**********************************************
  public IString(String base,
     String sort,
     String alt,
     String srcLanguage,
     String srcLocale,
     String tgtLanguage,
     String tgtLocale){this.baseString=base; this.sortstring=
        sort; this.altstring=alt; this.sourceLocale=srcLocale;
        this.sourceLanguage=srcLanguage;
        this.targetLocale=tgtLocale; this.targetLanguage=
        tgtLanguage; }
```

In this constructor, the source and target language and locale which are employed to select the characters entered into baseString 304, sortstring 306 and altstring 308 may be specified. This latter constructor may be employed to create an IString object 302 in other than the host system default language, or in host systems where data for the IString object 302 is received from another system and a local instance is created.

It should be noted that transliteration engine 320 and messaging methods 326 need not necessarily be implemented within an IString class 202 as depicted in FIG. 2, and that IME method 320 need not be implemented separately.

Transliteration engine 320 and messaging methods 326 may instead be implemented within separate subclasses which are appropriately constructed and/or invoked by IString class 302 as necessary, while IME 324 may be implemented as a method within IString class 302.

Transliteration engine 320 and IME 324 and are only required by data entry methods 310 to gather input data for IString class 302 objects under certain locale and language property settings. Otherwise, data may be programmatically input into baseString 304, sortstring 306, and altstring 308 by invoking the proper constructor. The methods which may be invoked by programs at runtime to programmatically get and set fields within IString 302 include:

```
/**********************************************
*
* <P></P>
*
* <dt><b>Description: </b><dd>
* <p>Get the IString baseString. </p>
*
* @returns str String containing the base string
*
**********************************************
  public String getBaseString( ){
     return this.baseString;
     }
```

This method returns the contents for baseString 304 for an IString object 302. Similar methods return the contents of sortstring 306 and altstring 308:

```
/**********************************************
*
* <dt><b>Description:</b><dd>
* <p>Get the IString sortString.<p>
*
* @returns str String containing the sort string
*
**********************************************
  public String getSortString( ){
     return this.sortString;
     }
/**********************************************
*
* <P></P>
*
* <dt><b>Description:</b><dd>
* <p>Get the IString altString.</p>
* @returns str String containing the alt string
*
**********************************************
  public String getAltString( ){
     return this.altString;
     }
```

The methods also include setting baseString 304:

```
/**********************************************
* <dt><b>Description:</b><dd>
* <p>Set the IString baseString.</p>
*
* @param str String containing the base string
*
**********************************************
  public void setBaseString(String sBase){
     this.baseString=sBase;
     }
``` as well as sortstring 306 and altstring 308:

```
/**********************************************
*
* <P></P>
```

```
*
* <dt><b>Description:</b><dd>
* <p>Set the IString sortString.</p>
*
* @param str String containing the sort string
*
*************************************************
public void setSortString(String sSrt){
   this.sortString=sSrt;
}
/************************************************
*
* <P></P>
* <dt><b>Description:</b><dd>
* <p>Set the IString altString.</p>
* @param str String containing the alt string
*
*************************************************
public void setAltString(String sAlt){
   this.altString=sAlt;
   }
```

In addition to getting and setting baseString 304, sortString 306, and altstring 308 for an IString object 302, programs may need to get or set the display locale or language of an IString object 302. Accordingly, other methods are provided to permit a program to get and/or set the locale or language properties of IString data:

```
*************************************************
*
* <P></P>
*
* <dt><b>Description:</b><dd>
* <p>Get the locale of the IString data.</p>
*
* @returns loc Locale containing the locale of the data
*
*************************************************
public Locale getLocale( ){
   Locale loc=new Locale(this.sourceLanguage,
      this.sourceLocale);
   return loc;
   }
/************************************************
*
<p></p>
*
* <dt><b>Description:</b><dd>
* <p>Set the locale of the IString data.</p>
*
* @param loc Locale of the data
*
*************************************************
public void setLocale(Locale loc){
   this.sourceLocale=loc.getLocale( );
   this.sourceLanguage=loc.getLanguage( );
   }
/************************************************
*
* <P></P>
```

```
*
* <dt><b>Description: </b><dd>
* <p>Get the display language of the IString data.</p>
*
* @returns Display language of the data
*
*************************************************
public String getDisplayLanguage( ){
   Locale loc=new Locale(this.sourceLanguage,
      this.sourceLocale);
   return loc.getDisplayLanguage( );
   }
/************************************************
<P></P>
*
* <dt><b>Description:<Ib><dd>
* <p>Get the display locale of the IString data.</p>
* @returns Display locale of the data
*
*************************************************
public String getDisplayLocale( ){
   if(this.sourceLanguage==null&&this.sourceLocale==
      null)
   return null;
   else{
      Locale loc=new Locale(this.sourceLanguage,
         this.sourceLocale);
      return loc.getDisplayLocale( );
   }}
```

While these methods are available, IString class 302 preferably exhibits a "black box" behavior such that the programmer/user need not know anything about the methods implemented for IString class 302. IString class 302 simply appears as a data type which encapsulates extra information about baseString 304 and also includes some methods for transforming characters from one character set to another. For special cases where the sortstring field 306 or altstring field 308 are to be exposed to the user in addition to or in lieu of baseString 304, either for editing or for display only, a separate set of controls may be provided.

In the present invention, IString class 302 is employed to effectively transfer human language data across systems employing incongruous languages. The contents of baseString 304 provide a native representation of the text in the default language of the system originating the IString object 302. However, for each system participating in the exchange of data with other systems running in different human languages, the targetLocale property 316 and targetLanguage 318 property of an IString object 302 are preferably set to a common value (e.g., targetLocale="US", targetLanguage="en"). The contents of AltString 308 will thus contain a common, cross-language representation of the text string. In systems where the default language of a system receiving an object differs from the language of the contents of baseString 304, IString class object 302 may automatically switch to presenting the contents of altstring 308 as the text string to be displayed or processed.

Figure 4:
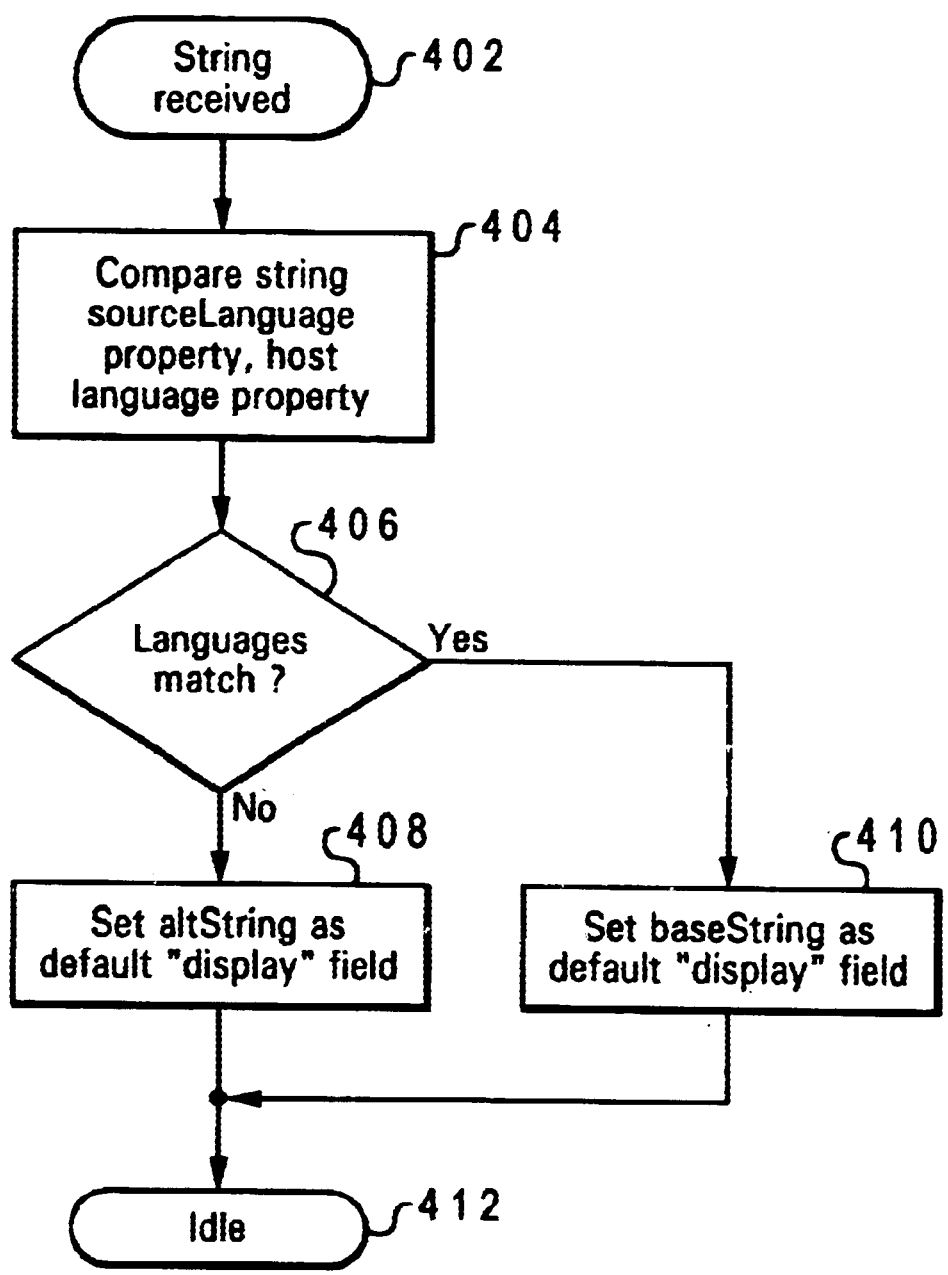
FIG. 4 is a high level flowchart for a process of transferring human language data between systems running in different languages in accordance with a preferred embodiment of the present invention.

Referring to FIG. 4, a high level flowchart for a process of transferring human language data between systems running in different languages in accordance with a preferred embodiment of the present invention is depicted. The process begins at step 402, which depicts receiving a text string within a multi-field text string object as described above at a receiving system from an originating system. The process next passes to step 404, which illustrates comparing a sourceLanguage property code for the multi-field text string object with a language property code for the default language of the receiving system.

The process then passes to step 406, which depicts a determination of whether the multi-field text string object and receiving system default languages match. If so, the process proceeds to step 410, which illustrates setting the baseString field of the multi-field text string object at the default "display" field for the multi-field text string object within the receiving system. The default "display" field will be utilized both for display and for processing, such as keywords searches, etc.

Referring again to step 406, if the multi-field text string object and receiving system default languages do not match, the process proceeds instead to step 408, which depicts setting the altString field, containing a common, cross-langauge representation for all systems exchanging data regardless of what language they are running in, as the default "display" field. From either of steps 408 or 410, the process then passes to step 412, which illustrates the process becoming idle until another text string is received.

Figure 5A:
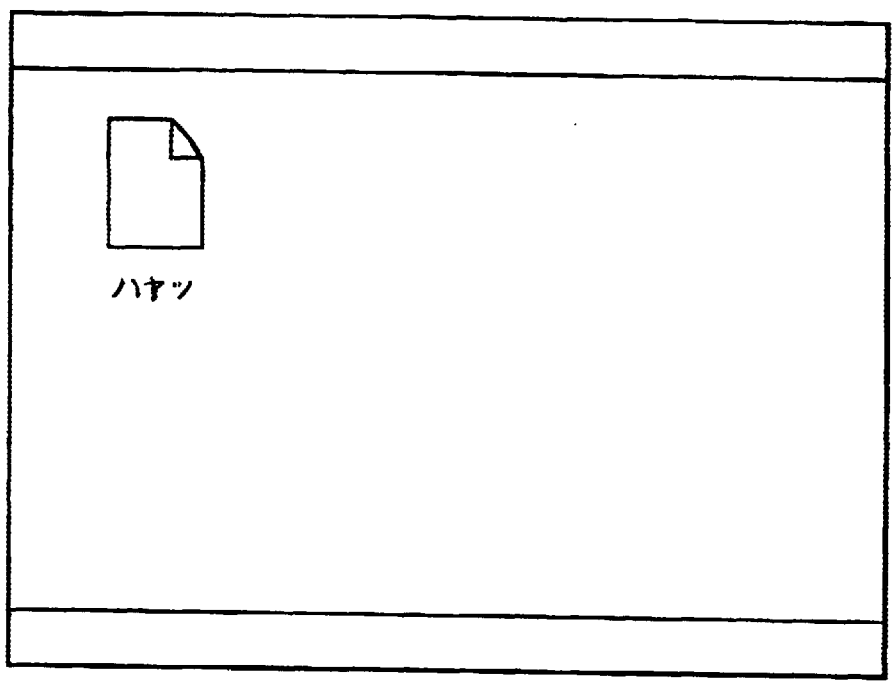
FIGS. 5A–5B are user interface diagrams for a process of transferring human language data between systems running in different languages in accordance with a preferred embodiment of the present invention.
Figure 5B:
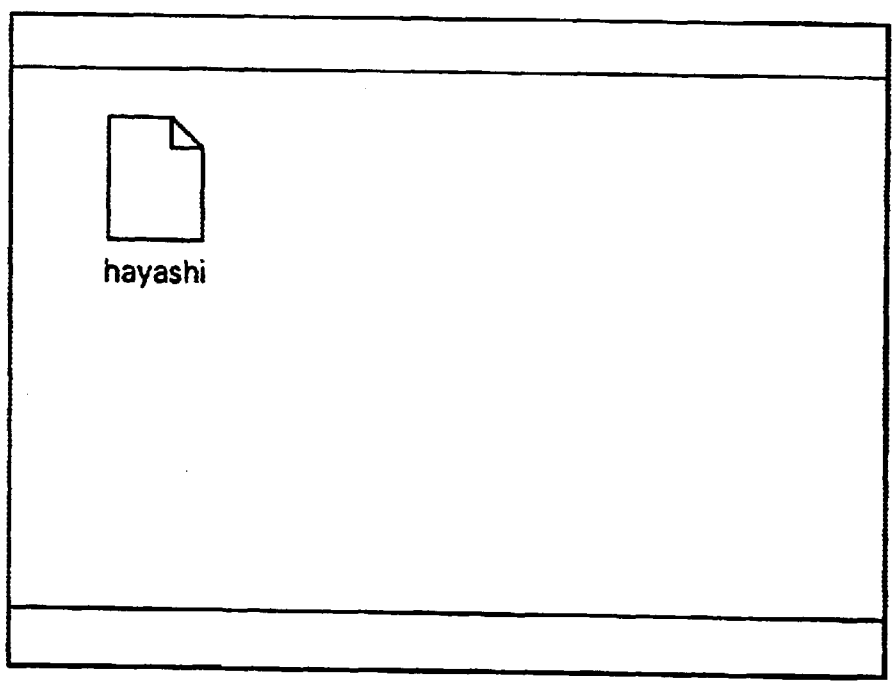

With reference now to FIGS. 5A–5B, user interface diagrams for a process of transferring human language data between systems running in different languages in accordance with a preferred embodiment of the present invention are illustrated. FIG. 5A illustrates the user interface in an originating system, in which an object having the display name contained within a multi-field text string object is displayed in the default human language (Japanese) in which the system is running. (Katakana characters are utilized rather than a Kanji symbol merely for convenience).

FIG. 5B illustrates the user interface displaying the same object in a receiving system, where the object was transferred from the originating system to the receiving system and the receiving system is running in a human language different from the human language in which the originating system is running (say, for example, German or phonetic English). The object name displayed is therefore automatically switched to the common, cross-language representation (phonetic spelling in English, for example).

The present invention allows human language data to be transferred or to migrate across system boundaries, where multiple systems are running in different human languages. The native or default human language in which a text string is entered is encapsulated together with a common, cross-language representation such as a phonetic spelling of the text string in English. Comparisons of the data entry langauge and a host default language are made when a text string object is received from another system. Where the data entry and host languages are incompatible, the text string object automatically switches to presenting the common, cross-language representation of the text string for display and processing requests. Systems running in completely incongruous languages may thus meaningfully share data without relying on encoded lookups for message dialogs and without being restricted to exchanging data in one language only.

It is important to note that while the present invention has been described in the context of a fully functional device, those skilled in the art will appreciate that the mechanism of the present invention and/or aspects thereof are capable of being distributed in the form of a computer usable medium of instructions in a variety of forms, and that the present invention applies equally regardless of the particular type of signal bearing media used to actually carry out the distribution. Examples of computer usable media include: nonvolatile, hard-coded type media such as read only memories (ROMs) or erasable, electrically programmable read only memories (EEPROMs), recordable type media such as floppy disks, hard disk drives and CD-ROMs, and transmission type media such as digital and analog communication links.

While the invention has been.particularly shown and described with reference to a preferred embodiment, it will be understood by those skilled in the art that various changes in form and detail may be made therein without departing from the spirit and scope of the invention.

What is claimed is:

1. A method for transferring human language data across system boundaries, comprising:

receiving a multi-field text string object encapsulating a first representation of a text string in a data entry human language and a second representation of the text string in a common data exchange human language;

comparing the data entry human language to a default human language for a host system receiving the multi-field text string object;

responsive to determining that the data entry human language and the host system default human language do not match, setting the second representation of the text string as a default field for the multi-field text string object; and setting a target language property for all multi-field text string objects to a common code identifying the common data exchange human language in all systems exchanging text strings encapsulated in multi-field text string objects.

2. The method of claim 1, wherein the step of receiving a multi-field text string object encapsulating a first representation of a text string in a data entry human language and a second representation of the text string in a common data exchange human language further comprises:

receiving the multi-field text string object, wherein the multi-field text string object includes a first field containing a first character string comprising characters from the data entry human language and forming the first representation and a second field containing a second character string comprising characters from a common data exchange human language and forming the second representation.

3. The method of claim 1, wherein the step of receiving a multi-field text string object encapsulating a first representation of a text string in a data entry human language and a second representation of the text string in a common data exchange human language further comprises:

receiving the multi-field text string object, wherein the data entry human language and the common data exchange human language are different.

4. The method of claim 1, wherein the step of receiving a multi-field text string object encapsulating a first representation of a text string in a data entry human language and a second representation of the text string in a common data exchange human language further comprises:

receiving the multi-field text string object, wherein the data entry human language and the common data exchange human language are the same.

5. The method of claim 1, wherein the step of receiving a multi-field text string object encapsulating a first representation of a text string in a data entry human language and a second representation of the text string in a common data exchange human language further comprises:

receiving the multi-field text string object, wherein the common data exchange human language is English.

6. The method of claim 1, wherein the step of comparing the data entry human language to a default human language for a host system receiving the multi-field text string object further comprises:

comparing a source language property code for the multi-field text string object to a language property code for the host system.

7. The method of claim 1, wherein the step of setting the second representation of the text string as a default field for the multi-field text string object further comprises:

providing the second representation of the text string in response to a display or processing request.

8. The method of claim 1, further comprising:

responsive to determining that the data entry human language and the host system default human language match, setting the first representation of the text string as the default field for the multi-field text string object.

9. A system for transferring human language data across system boundaries, comprising:

a multi-field text string object encapsulating a first representation of a text string in a data entry human language and a second representation of the text string in a common data exchange human language;

a receiving system receiving the multi-field text string object; and default field selection logic within the receiving system, wherein the default field selection logic:

compares the data entry human language to a default human language for a host system receiving the multi-field text string object; and responsive to determining that the data entry human language and the host system default human language do not match, sets the second representation of the text string as a default field for the multi-field text string object; and setting a target language property for all multi-field text string objects to a common code identifying the common data exchange human language in all systems exchanging text strings encapsulated in multi-field text string objects.

10. The system of claim 9, wherein the multi-field text string object further comprises:

a first field containing a first character string comprising characters from the data entry human language and forming the first representation; and a second field containing a second character string comprising characters from a common data exchange human language and forming the second representation.

11. The system of claim 9, wherein the data entry human language and the common data exchange human language are different.

12. The system of claim 9, wherein the data entry human language and the common data exchange human language are the same.

13. The system of claim 9, wherein the default field selection logic compares a source language property code for the multi-field text string object to a language property code for the receiving system.

14. The system of claim 1, wherein the receiving system provides the default field of the text string in response to a display or processing request.

15. The system of claim 9, wherein the default field selection logic, responsive to determining that the data entry human language and the host system default human language match, sets the first representation of the text string as the default field for the multi-field text string object.

16. A computer program product comprising program instructions tangibly stored on a recordable medium for transferring human language data across system boundaries, said product further comprising:

instructions for receiving a multi-field text string object encapsulating a first representation of a text string in a data entry human language and a second representation of the text string in a common data exchange human language;

instructions for comparing the data entry human language to a default human language for a host system receiving the multi-field text string object;

instructions, responsive to determining that the data entry human language and the host system default human language do not match, for setting the second representation of the text string as a default field for the multi-field text string object; and instructions for setting a target language property for all multi-field text string objects to a common code identifying the common data exchange human language in all systems exchanging text strings encapsulated in multi-field text string objects.

17. The computer program product of claim 16, wherein the instructions for receiving a multi-field text string object encapsulating a first representation of a text string in a data entry human language and a second representation of the text string in a common data exchange human language further comprise:

instructions for receiving the multi-field text string object, wherein the multi-field text string object includes a first field containing a first character string comprising characters from the data entry human language and forming the first representation and a second field containing a second character string comprising characters from a common data exchange human language and forming the second representation.

18. The computer program product of claim 16, wherein the instructions for receiving a multi-field text string object encapsulating a first representation of a text string in a data entry human language and a second representation of the text string in a common data exchange human language further comprises:

instructions for receiving the multi-field text string object, wherein the data entry human language and the common data exchange human language are different.

19. The computer program product of claim 16, wherein the instructions for receiving a multi-field text string object encapsulating a first representation of a text string in a data entry human language and a second representation of the text string in a common data exchange human language further comprise:

instructions for receiving the multi-field text string object, wherein the data entry human language and the common data exchange human language are the same.

20. The computer program product of claim 16, wherein the instructions for receiving a multi-field text string object encapsulating a first representation of a text string in a data entry human language and a second representation of the text string in a common data exchange human language further comprise:

instructions for receiving the multi-field text string object, wherein the common data exchange human language is English.

21. The computer program product of claim 16, wherein the instructions for comparing the data entry human language to a default human language for a host system receiving the multi-field text string object further comprise:

instructions for comparing a source language property code for the multi-field text string object to a language property code for the host system.

22. The computer program product of claim 16, wherein the instructions for setting the second representation of the text string as a default field for the multi-field text string object further comprise:

instructions for providing the second representation of the text string in response to a display or processing request.

23. The computer program product of claim 16, further comprising:

instructions, responsive to determining that the data entry human language and the host system default human language match, for setting the first representation of the text string as the default field for the multi-field text string object.

* * * * *

UNITED STATES PATENT AND TRADEMARK OFFICE
CERTIFICATE OF CORRECTION

PATENT NO. : 6,631,500 B1
DATED : October 7, 2003
INVENTOR(S) : Kumhyr

It is certified that error appears in the above-identified patent and that said Letters Patent is hereby corrected as shown below:

Column 8,
Line 64, after "String are the" please insert -- passed string, the altString is transliterated into the target --;

Column 12,
Line 25, after "*" please insert -- <P></P> --;
Line 52, after "***************" please insert -- <P></P> --.

Signed and Sealed this

Twenty-third Day of November, 2004

JON W. DUDAS
*Director of the United States Patent and Trademark Office*